United States Patent [19]
Maric

[11] Patent Number: 5,142,874
[45] Date of Patent: Sep. 1, 1992

[54] CRYOGENIC APPARATUS

[75] Inventor: Radovan R. Maric, Ontario, Canada

[73] Assignee: Union Carbide Canada Limited, Toronto, Canada

[21] Appl. No.: 766,089

[22] Filed: Sep. 27, 1991

Related U.S. Application Data

[60] Division of Ser. No. 683,200, Apr. 10, 1991, Pat. No. 5,079,925, which is a continuation-in-part of Ser. No. 506,811, Apr. 10, 1990, abandoned.

[51] Int. Cl.$^5$ ............................................. F17C 13/02
[52] U.S. Cl. ..................................... 62/49.2; 62/50.1; 62/208; 62/222
[58] Field of Search ................... 62/50.1, 49.1, 49.2, 62/208, 222

[56] References Cited

U.S. PATENT DOCUMENTS

| | | | |
|---|---|---|---|
| 2,922,545 | 12/1956 | Shanley | 62/51 |
| 3,049,887 | 8/1962 | Sharp et al. | 62/50.1 |
| 3,144,200 | 8/1964 | Taylor et al. | 230/69 |
| 3,296,809 | 1/1967 | Feuerstein | 62/55 |
| 3,360,947 | 1/1968 | Fretwell et al. | 62/45 |
| 3,422,632 | 1/1969 | Currie et al. | 62/45 |
| 3,455,117 | 7/1969 | Prelowski | 62/45 |
| 3,729,946 | 5/1973 | Massey | 62/51 |
| 3,913,340 | 10/1975 | Hurley | 62/45 |
| 4,192,147 | 3/1980 | Gilbert et al. | 62/49.2 |
| 4,203,299 | 5/1980 | Dinglinger | 62/49 |
| 4,279,626 | 7/1981 | Buchmüller et al. | 55/204 |
| 4,296,610 | 10/1981 | Davis | 62/50.1 |
| 4,464,904 | 8/1984 | Steigman | 62/50.2 |
| 4,510,760 | 4/1985 | Willand | 62/49 |
| 4,607,489 | 8/1986 | Cronsold | 62/49 |
| 4,715,187 | 12/1987 | Stearns | 60/50.1 |
| 4,726,195 | 2/1988 | Klee | 62/50.2 |

FOREIGN PATENT DOCUMENTS 2929709 2/1981 Fed. Rep. of Germany ....... 62/49.2

*Primary Examiner*—Ronald C. Capossela
*Attorney, Agent, or Firm*—Sim & McBurney

[57] ABSTRACT

A cryogenic apparatus is described which is designed to be of a compact size and to provide multiple functions, including chilling of gas or liquid, condensation of condensible vapors, and separation of liquid and gas phases of liquified cryogenic gas. The level and/or temperature of cryogenic liquid in the apparatus is controlled by sensors. An inlet for liquified cryogenic gas and an inlet for fluid to be chilled or condensed pass through an upper closure and outlets for liquid cryogen and chilled or condensed fluid are provided in the lower wall of the vessel.

9 Claims, 1 Drawing Sheet

CRYOGENIC APPARATUS

REFERENCE TO RELATED APPLICATION

This is a division of application Ser. No. 683,200 filed Apr. 10, 1991, now U.S. Pat. No. 5,079,925, which is a continuation-in-part of copending U.S. patent application Ser. No. 506,811 filed Apr. 10, 1990, now abandoned.

FIELD OF INVENTION

The present invention relates to a versatile multi-functional apparatus, particularly useful with cryogenic materials.

BACKGROUND TO THE INVENTION

Cryogenic liquids and gases are well known and are used in a variety of industrial applications. A variety of structures has previously been described for storage of such cryogenic materials, separation of cryogenic gases and liquids and for cooling gases and liquids using cryogenic materials.

A search conducted in the facilities of the U.S. Patent and Trademark Office with respect to the present invention has revealed the following U.S. Patents as the closest prior art:

| | |
|---|---|
| 4,510,760 | 3,422,632 |
| 4,607,489 | 3,455,117 |
| 2,772,545 | 3,729,946 |
| 3,144,200 | 3,913,340 |
| 3,296,809 | 4,203,299 |
| 3,360,947 | 4,279,626 |

This prior art is illustrative of prior art structures. For reasons which will become apparent below, none of this prior art discloses or suggests the apparatus of the present invention.

In the parent application, the Examiner also has cited the following U.S. patents as prior art:

| | |
|---|---|
| 3,049,887 | 4,192,147 |
| 4,296,610 | 4,464,904 |
| 4,715,187 | 4,726,195 |

Of these references, the Examiner has relied mainly on U.S. Pat. Nos. 4,296,610 (Davis) and 4,715,187 (Stearns). Both of these references relate to subcoolers, whose sole purpose is to reliquify two-phase cryogenic gas, by cooling the two-phase gas with exactly the same gas bath held at near atmospheric pressure, in which state the gas is the coldest possible. As will be seen herein, these devices are structurally and functionally different from the device provided by the present invention.

SUMMARY OF INVENTION

In accordance with the present invention, within a single compact apparatus, multiple functions are obtained. The apparatus of the invention functions as a chiller to cool gases or liquids to low temperatures, as a condenser to condense distillate media or other condensible vapor to liquid form, and as a phase separator whereby two phase gas-liquid mixtures may be separated for use of either the gas or liquid phase, or both.

Accordingly, in one aspect of the present invention, there is provided an apparatus for handling liquids and gases, which comprises insulated vessel means having an upper closure and a lower wall and enclosing a cooling zone into which a coolant medium may be introduced. First inlet means communicates through the upper closure with first pipe means extending within the vessel means through the cooling zone to a first outlet means in the lower wall. This arrangement permits a liquid or gas to be passed from the first inlet means to the first outlet means in heat exchange relationship with the cooling zone and to be discharged from the first pipe means through the lower wall.

Second inlet means communicates through the upper closure with pipe means extending within the vessel means to second outlet means within the vessel means whereby a coolant medium may be introduced to the vessel means.

Third outlet means communicates through the lower wall with the cooling zone for discharge of liquid coolant medium from the vessel means by direct downward flow under the required pressure to a point of use of the liquid coolant medium. Fourth outlet means communicates through the upper closure with the cooling zone for discharge of gaseous coolant medium from the vessel means.

Level control means is provided for controlling the level of liquid coolant medium in the cooling zone in the vessel means.

In this disclosure, particular emphasis is placed on the use of and the processing of cryogenic liquids, since it is these materials with which the apparatus of the invention is most useful. However, it will be apparent from the discussion of the construction and operation of the device, the invention is useful with other coolant materials. For example, when used as a condenser, a cold gas atmosphere may be sufficient to effect the desired degree of cooling.

The apparatus of the present invention differs from the prior art in a number of respects. In this regard, the apparatus possesses a pair of outlets in the lower wall, one from the pipe passing through the cooling zone and the other from the cooling zone itself. This arrangement permits the versatility of operation of the apparatus to act as a chiller, a condenser and a phase separator, as well as a source of cryogenic liquid, to be achieved. Referring to the prior art, as noted previously Davis and Stearns are concerned solely with subcoolers to reliquify two-phase cryogenic gas. For this purpose, a body of liquid cryogen at atmospheric pressure is contained in a housing and a coil through which the two-phase cryogenic gas is passed is immersed in the liquid cryogen.

The inlet and outlet for the coil both pass through the upper closure to the vessel. An inlet for liquid cryogen for the body of liquid cryogen also is provided through the upper closure, feed of such liquid cryogen being controlled by a liquid level controller of undisclosed structure. It is not intended that the liquid cryogen be employed other than for the purpose of subcooling the two-phase cryogenic gas passing through the coil nor that the liquid cryogen be maintained at atmospheric pressure.

The Davis device is intended to be comparatively large i.e. approximately 300 Kg when filled, and, therefore, is not easily mountable above the location of the process employing the cryogen. In the present invention, in its condenser mode of operation, it is intended that the liquid coolant medium in the apparatus be employed and, for this purpose, is fed from the apparatus through an outlet in the bottom wall by direct downward flow under the required pressure to the point of use, conveniently by locating the apparatus above the use point. For this purpose, the apparatus has a capacity of about 2 to 3 Kg of gas. This outlet is not a drain, as disclosed in Stearns for emptying the apparatus of liquid cryogen, but rather is a functional outlet permitting downstream use of the liquid cryogen, for example, as a coolant in blow-molding operations. For this purpose, the interior of the apparatus is maintained under superatmospheric pressure to assist in delivery of the liquid gas to the use point.

A direct downward feed of cryogenic liquified gas is important since any attempt to deliver liquified gas upward and in cyclical mode (e.g. approximately 20 secs per minute) is thwarted by the accumulation of vapor at the feed line apex, thereby creating a vapor lock and inhibiting good flow of desired liquid gas.

As noted above, the coil through which the two-phase cryogenic gas passes in the prior art Davis and Sterns structures both enters and exits through the upper closure to the vessel. In contrast, in the apparatus of the present invention, the coil exits through the bottom wall.

In the condenser or chiller mode of operation, the cooling medium present in the enclosure may be any cold medium which has a sufficiently low temperature to provide a controlled temperature to any medium flowing through the heat exchanger coil. For example, the cooling medium may have a temperature to condense vapors, for example, Freon 12, which requires a condensing temperature of $-135°$ C.

It is important that the outlet from the heat-exchanger coil be located in the bottom wall of the apparatus, so as to permit condensed or chilled material to drain completely from the coil when flow ceases, so as to avoid freeze up of liquid in the coil.

The present invention also includes the various procedures which are effected in the apparatus provided in accordance with the one aspect of the invention. Accordingly, in another aspect of the invention, there is provided a method for controlling the flow of cryogenic liquid to an end use location, which comprises feeding liquified cryogenic gas to an enclosed storage zone and forming a liquid phase and a gaseous phase therein, discharging the liquid phase by direct downward flow under a required pressure through a lower outlet from the storage zone, continuously sensing the level of the liquid phase in the storage zone, and controlling the feed of liquified cryogenic gas to the enclosed storage zone in response to the sensed level of the liquid phase to maintain a predetermined level of the liquid in the zone.

As will be apparent from the above discussion of the prior art, there is no disclosure in Davis or Stearns of a procedure for controlling the flow of cryogenic liquid to an end use by direct downward flow of liquid phase under a required pressure through a lower outlet. In addition, while the prior art Davis reference discloses monitoring liquid level and adding additional cryogen as required, this operation is not in response to flow of cryogenic liquid from the vessel.

In a further aspect of the invention, there is provided a method for cooling a fluid medium, which comprises flowing the fluid along an enclosed flow path in heat exchange relation with a body of heat-exchange medium which is capable of removing heat from the fluid and which is located in an enclosed storage zone, the enclosed flow path extending within the enclosed storage zone from an upper inlet to an lower outlet, and controlling the temperature of fluid exiting the enclosed storage zone at a desired value as a function of flow rate of the fluid along the enclosed flow path and the volume of the body of heat-exchange medium.

Again the prior art does not disclose such a procedure. While Davis and Stearns disclose passing a fluid along an enclosed flow path in heat exchange relationship with a liquid cryogen, the enclosed flow path does not exit through the bottom closure but rather through the top one and the purpose in Davis and Stearns is to reliquify two-phase cryogenic gas using a bath of the same material held at atmospheric pressure. Further, neither Davis nor Stearns discloses a system for control of the temperature of fluid exiting the enclosed storage zone as a dual function of flow rate and volume of heat-exchange medium.

A yet further aspect of the present invention provides a method for condensing a condensible vapor, which comprises flowing the condensible vapor along an enclosed flow path in heat exchange relation with a body of heat-exchange medium which is capable of removing heat from the condensible vapor sufficient to condense the same and which is located in an enclosed storage zone, the enclosed flow path extending within the enclosed storage zone from an upper inlet to a lower outlet, and controlling the temperature of liquid condensate exiting the enclosed storage zone at a desired value as a function of the temperature of the body of heat-exchange medium.

The prior art is not concerned with any procedure to effect condensation of condensible vapors to liquid condensate. Davis and Stearns disclose a procedure for reliquifying two-phase cryogenic gas by passage along an enclosed path in heat exchange relationship with a liquid cryogen, i.e. the same material.

In addition, the flow path exits the subcooler through the upper closure in Davis and Stearns rather than the lower wall, as in the present invention. Further, no disclosure exists in the prior art of a procedure for controlling the temperature of liquid condensate as a function of the temperature of the cryogen, or required herein.

DESCRIPTION OF PREFERRED EMBODIMENT

Figure 1:
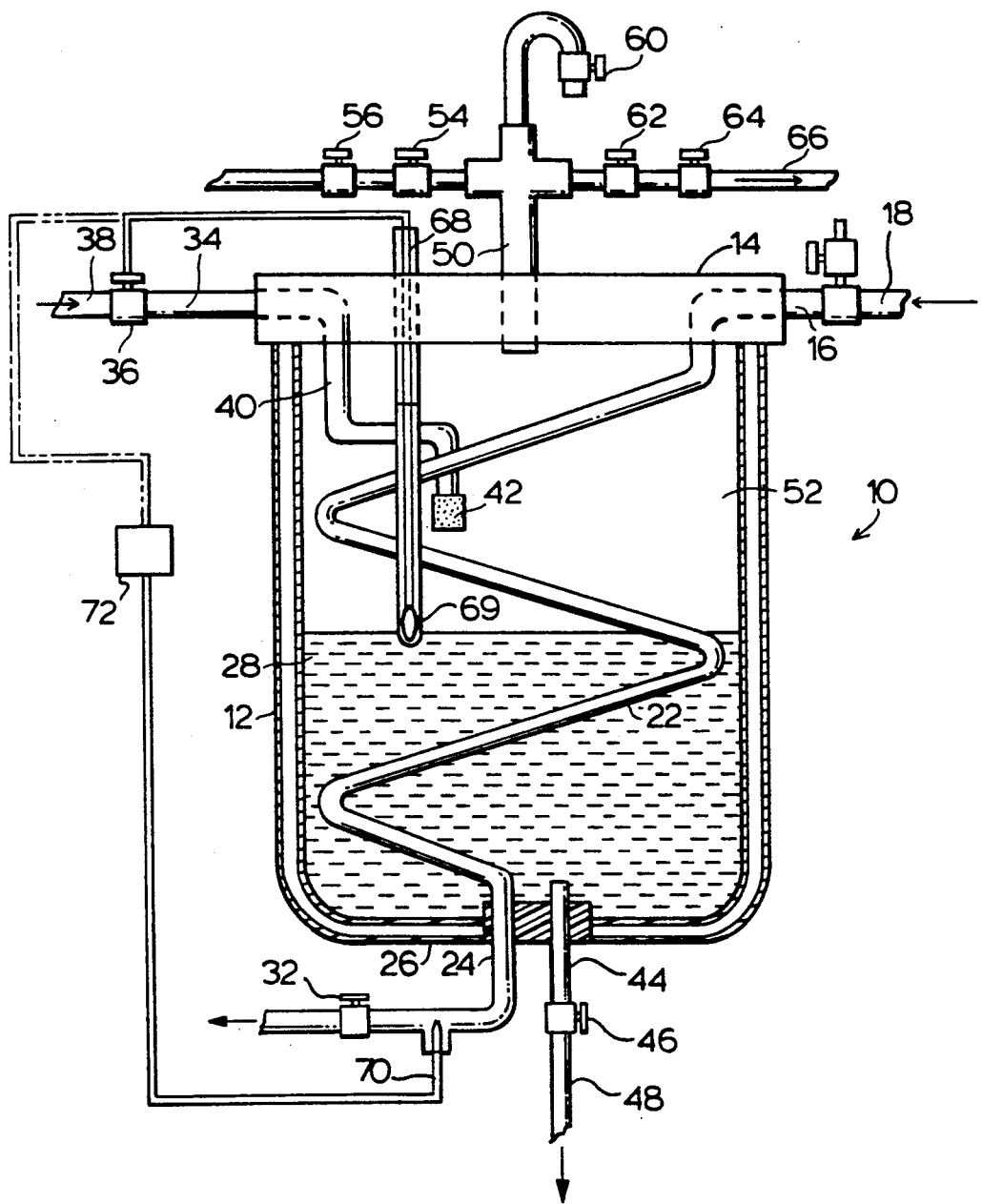
FIG. 1 is a part sectional view of a cryogenic apparatus provided in accordance with one embodiment of the invention.

Referring to the drawing, a cryogenic apparatus 10 comprises a vacuum-insulated vessel 12 of conventional construction and having an upper closure 14. Any other convenient form of insulation may be employed. The vessel 12 may be constructed to withstand internal pressures up to several hundred psig, depending on its intended use. A first upper inlet 16 to the vessel 12 through the upper closure 14 is connected to a feed line 18 for a liquid or gas to be chilled or a vapour to be condensed.

A heat exchanger coil 22 within the vessel 12 connects the first inlet 16 to a first outlet 24 in the lower wall 26 of the vessel 12. The heat exchanger coil 22 is partly immersed in a body 28 of cryogenic liquid in the vessel 12. The first outlet 24 is connected to a feed pipe 30 for conveying chilled liquid or gas or condensed vapour to a use point through a flow control valve 32.

A second upper inlet 34 to the vessel 12 through the upper closure 14 is connected through a solenoid valve 36 to a feed pipe 38 for a cryogenic coolant. A pipe 40 inside the vessel 12 is connected to the second inlet 34 for discharge of the cryogenic coolant into the vessel 12, through a second outlet 42, which may take the form of an anti-splash porous filter 42.

A third lower outlet 44 communicates with the body 28 of cryogenic liquid through the bottom wall 26 of the vessel for discharge of liquid cryogenic material from the vessel through solenoid valve 46 to a feed pipe 48 and thence by direct downward flow under the required pressure to the end use point for the liquid cryogenic material.

A fourth upper outlet 50 communicates through the upper closure 14 to the vessel 12 with the gas atmosphere 52 above the body 28 of liquid cryogenic material, to enable gas to be discharged through a control valve 54 and a check valve 56 to a feed pipe 58 to end use or venting. A safety pressure relief valve 60 is provided to guard against overpressure in the vessel 12. The outlet 50 also is connected through flow control valve 62 to back pressure adjustment valve 64 to provide for control of internal pressure, as required.

An elongate level control device 68, which may include a thermistor 69 at the lower end thereof extends through the top closure 14 to the vessel 12 to communicate with the upper level of the body 28 of liquid in the vessel 12. The thermistor 69 is connected by suitable wiring to the solenoid valve 36 to control flow in response to electrical signals from the thermistor 69. As soon as the thermistor 69 is covered by the liquid, the coolant in-flow ceases as the solenoid valve 36 is closed. Similarly, when the liquid drops below the thermistor, the solenoid valve 36 opens and coolant flow recommences. The level control device 68 preferably takes the form of a single thermistor sensor packaged into a narrow channel stainless steel tube, so as to minimize heat transfer into the vessel. The vertical position of the level control device is adjustable to provide the required liquid level.

The use of thermistors as level sensors is well known, as indicated by the Sharp et al reference (U.S. Pat. No. 3,049,887) noted above. However, it is believed that the use of single thermistor 69 for level control, in contrast to the multiple thermistors in Sharp et al, is unique.

As illustrated, the thermistor 69 is mounted in the tip of the tube 68. When the thermistor 69 is not immersed in liquid nitrogen or other suitable coolant medium, sufficient heat is carried by conduction of the tubing to warm up the thermistor 69 so that the level controller 68 opens the solenoid valve 36 until the thermistor again becomes immersed in liquid nitrogen, so that the valve 36 then is closed.

The stainless steel tubing functions as a delay mechanism so that opening of the solenoid valve 36 occurs not immediately when the thermistor 69 is immersed in the liquid nitrogen or exposed, but rather occurs with a delay that permits level changes of a desired degree, for example, approximately one inch. This arrangement permits a minimal heat influx to the cryogen and is beneficial in effecting refills at frequent intervals when operating in the separation mode, so that supply piping is maintained at a continuous low temperature, so that cryogen warming inside the supply lines is minimized.

A temperature sensor 70 is provided in the outlet pipe 24 from the vessel 12 to sense the temperature therein during operation of the device 10 as a condenser, as described in more detail below. A temperature controller 72 is provided connected by suitable wiring to the temperature sensor 70 and the solenoid valve 36, to permit operation of the solenoid valve 36 to be controlled directly from the level controller 68 or from the temperature controller 72.

OPERATION

The cryogenic apparatus 10 is capable of multiple functions, namely as a chiller, a condenser and a phase separator, as desired. When functioning as a chiller, a gas or liquid to be chilled is passed from the first inlet 16 to the first outlet 24 through the heat exchanger coil 22. The body 28 of cryogenic liquid, such as liquid nitrogen, liquid argon or other liquified gas, cools the liquid or gas as it passes through the coil 22. In this mode of operation, there is generally a substantially uniform flow of liquid or gas through the device 10 which is desired to be at a specific exit temperature.

The condenser function is similar to the chiller function and is employed to condense condensible vapours to liquid form. In this mode of operation, there is generally a non-uniform flow of condensible vapors to the device, so that a variable degree of cooling is required. The outlet 24 in the lower closure 26 ensures that no liquid is trapped in the coil 22 when flow to the inlet 16 ceases in either the chiller or condenser mode of operation.

The exit temperature of the liquid or gas passing through the control valve 32 depends upon the level of the body 28 of liquid nitrogen or other coolant medium and the flow rate of the liquid or gas in the heat exchange coil 22. The liquid nitrogen level is determined by the level control device 68, which may be set at selected heights within the vessel, while the flow rate of the liquid or gas through the heat exchange coil 22 is controlled by the control valve 32. The level control device 68 controls the solenoid valve 36 to permit additional cryogenic liquid to be passed into the vessel 12 to maintain the desired liquid level, as described above.

The temperature sensor 70 senses the temperature of the liquid condensate in the outlet 24 from the vessel. The temperature is preset to the optimal temperature for condensation of the vapors being treated in the heat exchanger coil 22 by introduction of the appropriate quantity of cooling medium to the interior of the vessel 10 through pipe 40. During passage of the condensible vapor through the coil 22, the interior temperature of the vessel 10 is sensed indirectly by the sensor 70 located in the outlet pipe 24. If the flow rate of condensible gases becomes sufficiently high as to cause a rise in temperature in the condensate, the temperature sensor 70 generates an electrical signal which, via controller 72, opens the solenoid valve 36 to permit further coolant to enter the vessel 10 to restore the internal temperature to the desired level, thereby to restore the temperature of condensate to the desired value. The level controller device 68 is set to its upper extent during the condenser mode and serves to prevent overfilling of the vessel 12 by coolant. In this way, the cryogenic apparatus 10 may control precisely the temperatures required to condense a wide range of vapour distillates.

The phase separation function serves to separate gaseous phase from liquified cryogenic gases for use of liquid phase, gaseous phase or both, at various pressures, as required. A two-phase cryogenic mixture is fed by line 38, through solenoid valve 36, to the interior of the vessel 12, and forms liquid phase 28 and gaseous atmosphere 52. These materials are discharged respectively through outlets 44 and 50 to their end use points.

One example of the use of the phase separation function is in the blow molding of plastic containers where nitrogen is required in the liquid phase for efficient cooling. As noted earlier, liquified nitrogen is difficult to convey upwardly, particularly where short-duration cyclical injections are the mode of utilization. During non-flow segments of such cycles, the liquified gas inside thermally-insulated transfer tubing or hoses partially gasifies, with the gas phase sitting on top of the liquid. When the demand for use initiates, it is only the gas that is available initially.

The cryogenic apparatus of the present invention alleviates the problem since its compact form enables it to be elevated above the use point, thereby enabling delivery by a direct downward flow of liquid under the required pressure to be effected through outlet 44 and a path for any gas bubbles to escape upwardly by floating upwardly against the downward liquid flow.

The accumulated gas atmosphere 52 may be employed to supplement the initial vapour blowing of the parison, so that no gas is wasted in the blow-molding operation.

The cryogenic apparatus of this present invention, therefore, provides a versatility of operation not previously achieved, namely the multiple functions of phase separation, chilling and condensation, and provides such versatility in a compact unit.

SUMMARY OF DISCLOSURE

In summary of this disclosure, the present invention provides a novel cryogenic apparatus which combines the multiple functions of chilling, condensing and phase separation in a single unit by employing a specific arrangement of inlets and outlets in combination with liquid level and/or temperature control. Modifications are possible within the scope of this invention.

What I claim is:

1. An apparatus for handling liquids and gases, which comprises:
    insulated vessel means having an upper closure and a lower wall and housing a cooling zone into which a coolant medium may be introduced,
    first inlet means communicating through said upper closure with first pipe means extending within said vessel means through said cooling zone to a first outlet means in said lower wall, whereby a liquid or gas may be passed from said first inlet means to said first outlet means in heat exchange relationship with said cooling zone and may be discharged from said first pipe means through said lower wall,
    second inlet means communicating through said upper closure with second pipe means extending within said vessel means to second outlet means within said vessel, whereby a coolant medium may be introduced to said vessel means,
    first solenoid valve means provided in said second inlet means for connecting a source of coolant medium to said second pipe means,
    temperature sensing means located in operative relation to said first outlet means for sensing the temperature of said cooling zone, said temperature sensing means being operatively connected to said first solenoid valve means to open said first solenoid valve means when the temperature of said cooling zone detected by said temperature sensing means is above a predetermined temperature to permit coolant medium to enter said cooling zone and to close said first solenoid valve when the temperature of said cooling zone detected by said temperature sensing means is below a predetermined temperature to prevent coolant medium from entering said cooling zone,
    third outlet means communicating through said lower wall with said cooling zone for discharge of liquid coolant medium from said vessel means by a direct downward flow to a point of use of said liquid coolant medium,
    fourth outlet means communicating through said upper closure with said cooling zone for discharge of gaseous coolant medium from said vessel means, and
    level control means for controlling a level of liquid coolant medium in said cooling zone in said vessel means.

2. The apparatus of claim 1 wherein said first outlet means has flow control valve means for discharging heat exchanged medium from said first pipe means at a temperature determined by the flow rate through said flow control valve means and the quantity of the liquid coolant medium.

3. The apparatus of claim 1 wherein said pipe means is formed into a coil.

4. The apparatus of claim 1 wherein said second outlet means has anti-splash porous filter means thereat to prevent splashing of cryogenic liquid introduced as said coolant medium.

5. The apparatus of claim 1, wherein said level control means comprises single thermistor means to generate an electrical signal upon contact with liquid coolant medium in said cooling zone and said single thermistor means is operatively connected to said solenoid valve means to close said solenoid valve means when said electrical signal is generated by said single thermistor means, thereby to prevent the flow of coolant medium to said cooling zone until said thermistor means no longer contacts said liquid coolant.

6. The apparatus of claim 1 wherein said third outlet means has second solenoid valve means for discharging liquid coolant medium from a body of liquid coolant medium in said vessel.

7. The apparatus of claim 6 wherein said fourth outlet means has flow control valve means and check valve means for discharging gaseous coolant medium from a gaseous phase in said vessel.

8. The apparatus of claim 7 wherein said fourth outlet means has back pressure control valve means therein for maintaining a desired pressure in said vessel and pressure safety relief valve means therein.

9. The apparatus of claim 1 wherein said level control means comprises an elongate tube having a single thermistor at the lower and thereof and extending through a top closure to said vessel to be located at an adjustable height within said vessel.

* * * * *